United States Patent [19]

McKeown

[11] Patent Number: 5,835,137
[45] Date of Patent: Nov. 10, 1998

[54] METHOD AND SYSTEM FOR COMPENSATING FOR MOTION DURING IMAGING

[75] Inventor: Donald M. McKeown, Warsaw, N.Y.

[73] Assignee: Eastman Kodak Company, Rochester, N.Y.

[21] Appl. No.: 612,709

[22] Filed: Mar. 8, 1996

[51] Int. Cl.⁶ .................................................. H04N 5/225
[52] U.S. Cl. ........................ 348/208; 348/295; 348/144
[58] Field of Search .................................... 348/295, 144, 348/145, 207, 208

[56] References Cited

U.S. PATENT DOCUMENTS

| | | | |
|---|---|---|---|
| 4,280,141 | 7/1981 | McCann et al. | 348/295 |
| 4,600,283 | 7/1986 | Gorsch et al. | 354/66 |
| 4,654,876 | 3/1987 | Atkins | 382/54 |
| 4,734,724 | 3/1988 | Braunschweig et al. | 354/66 |
| 4,747,155 | 5/1988 | Dotson | 382/42 |
| 4,952,809 | 8/1990 | McEwen | 250/342 |
| 5,155,597 | 10/1992 | Lareau et al. | 358/213.24 |
| 5,227,883 | 7/1993 | Dischert et al. | 358/160 |
| 5,231,502 | 7/1993 | Pfister | 358/213.11 |
| 5,248,873 | 9/1993 | Allen et al. | 250/208.1 |
| 5,504,523 | 4/1996 | Wight et al. | 348/208 |

FOREIGN PATENT DOCUMENTS

| | | | |
|---|---|---|---|
| 2 384 407 | 10/1978 | France . | |
| 0 608 945 A1 | 8/1994 | France . | |
| 2186149A | 8/1987 | United Kingdom | H04N 5/335 |
| 2262383A | 6/1991 | United Kingdom | H04N 3/15 |
| 2262383 | 6/1993 | United Kingdom | H04N 3/15 |
| WO92/10059A1 | 6/1992 | WIPO | H04N 3/15 |

*Primary Examiner*—Wendy Garber
*Attorney, Agent, or Firm*—Thomas H. Close

[57] ABSTRACT

An imaging system in accordance with the present invention compensates for relative motion of the imaging system with respect to a scene to be captured. The imaging system includes an array, a light shield, a lens, a horizontal clocking system, and a vertical clocking system. The array includes at least two or more columns and rows of pixels, with each pixel exposed to the scene storing charge representative of the scene. The light shield is connected to the array and covers every other column of pixels. The lens is a focal length from the array and focuses the scene onto the array. The horizontal clocking system is coupled to each pixel in each row of the array and shifts charge from each pixel in each row exposed to the scene to each adjacent pixel in each row at a horizontal transfer frequency. The vertical clocking system is coupled to each pixel in each column covered by the light shield and shifts charge from each the pixel in each columns covered by the light shield to the next pixel in each column covered by the light shield at a vertical transfer frequency. The horizontal clocking system stops shifting charge between adjacent pixels in each row when an exposure time for capturing the scene expires. The imaging system may also include an imaging control system which determines a motion transfer rate which is the rate at which the scene moves down from one pixel in each column to the next pixel in each column. A method in accordance with the present invention includes the steps of exposing the columns and rows of pixels in the array to the scene, each pixel exposed to the scene storing charge representative of the scene, shifting charge from each pixel in each row exposed to the scene to each adjacent pixel in each of the rows at a horizontal transfer frequency, and shifting charge from each pixel in each of the columns covered by the light shield down to the next pixel in each column covered by said light shield at a vertical transfer frequency.

13 Claims, 9 Drawing Sheets

$D_i = V_i \times t_{exp}$

METHOD AND SYSTEM FOR COMPENSATING FOR MOTION DURING IMAGING

FIELD OF THE INVENTION

This invention relates generally to imaging systems and more particularly, to a method and system for compensating for relative motion of an imaging system with respect to a scene being captured.

BACKGROUND OF THE INVENTION

A captured image can appear blurred when a scene being captured by a stationary imaging system is moving or when the scene being captured is stationary and the imaging system is moving, such as during aerial imaging. In aerial imaging, the amount of image displacement is a function of aircraft speed, exposure time, altitude, and camera focal length. A more detail example illustrating the problem of blurring of captured images during aerial imaging is illustrated in FIGS. 1(a–c).

Figure 1A:
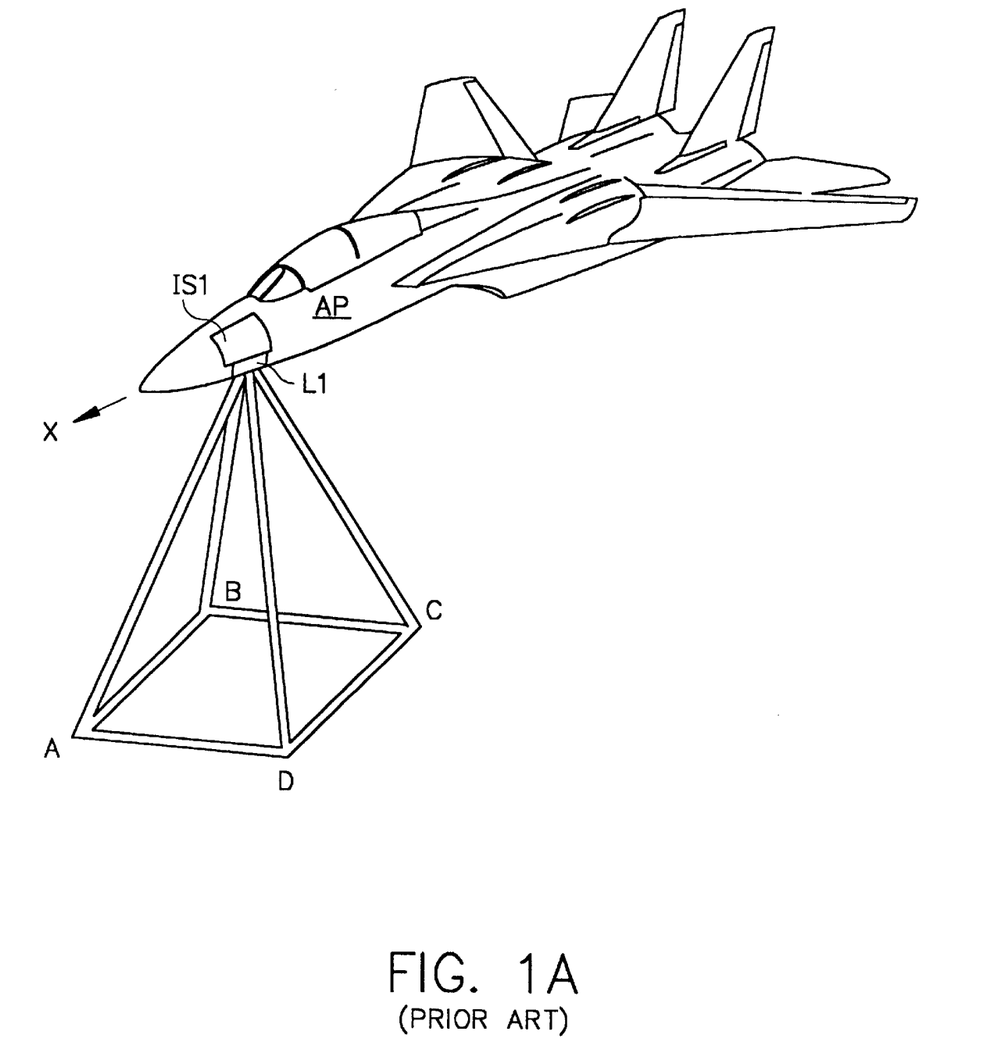
FIG. 1(a) is a pictorial view of a prior art imaging system in an airplane capturing a stationary scene.

Referring to FIG. 1(a), an airplane AP with an imaging system IS1 with a lens L1 is illustrated. Airplane AP is traveling in the direction of the arrow X. A stationary scene, defined by four corners A–D, is being captured by imaging system IS1.

Figure 1B:
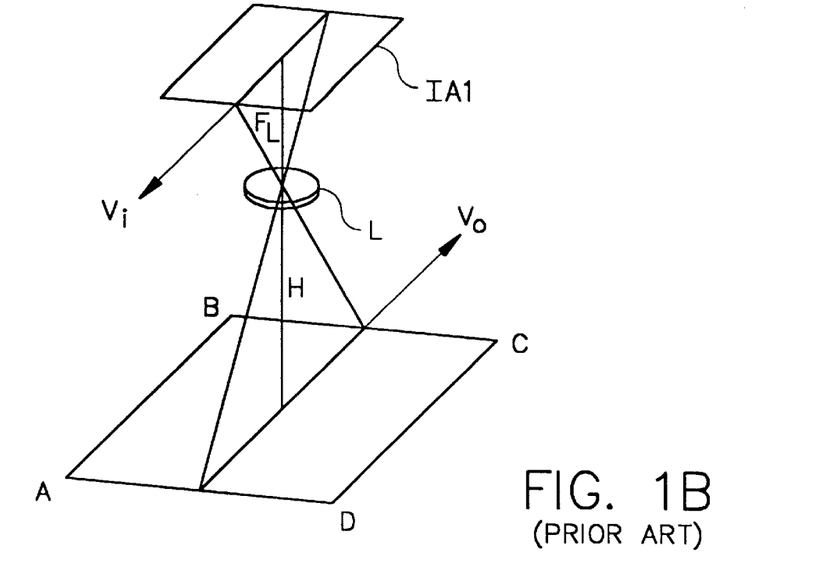
FIG. 1(b) is a partial, block diagram of the prior art imaging system with a lens and an imaging array and also showing the stationary scene.

Referring to FIG. 1(b), lens L1 of imaging system IS1 focuses stationary scene onto an imaging array IA1 in imaging system. Lens L1 is located at an altitude H above the stationary scene and at a focal length $f_L$ from imaging array IA1. The stationary scene has a velocity $V_o$ relative to imaging system IS1. The velocity $V_i$ of the image of the stationary scene to be captured on imaging array IA1 is obtained from the following equation: $V_i = V_o \times (f_L/H)$.

Figure 1C:
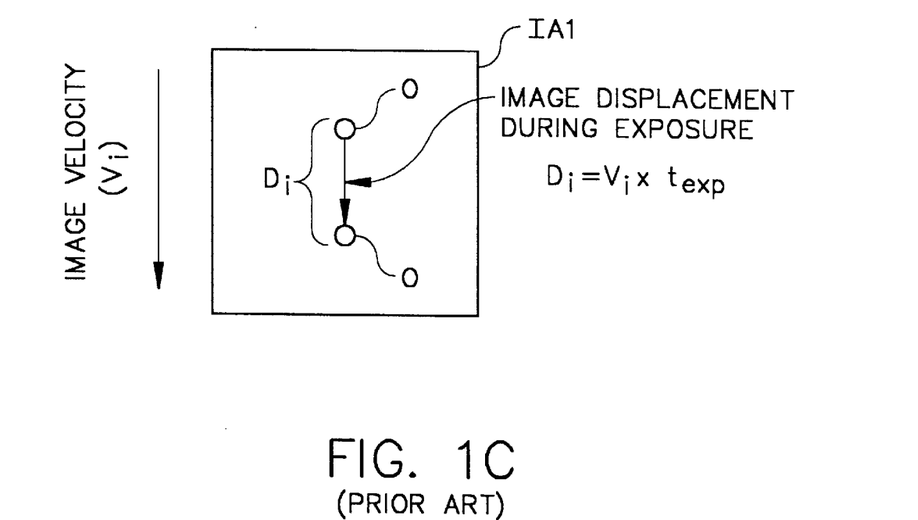
FIG. 1(c) is a diagram of the imaging array shown in FIG. 1(b) during exposure.

The amount the stationary scene is displaced on imaging array IA1 when there is relative motion between the stationary scene and imaging array IA1 is illustrated in FIG. 1(c) with an object O in the stationary scene. The displacement of object O is obtained from the following equation: $D_i = V_i \times t_{exp}$, where $D_i$ is the amount of displacement of object O and $t_{exp}$ is the minimum amount of time imaging array IA1 needs to be exposed to the stationary scene to capture an image. Any image displacement $D_i$ causes the captured image to appear blurred or smeared. As explained below, imaging systems have been developed to compensate for forward motion, however these imaging systems are less than ideal.

Figure 2A:
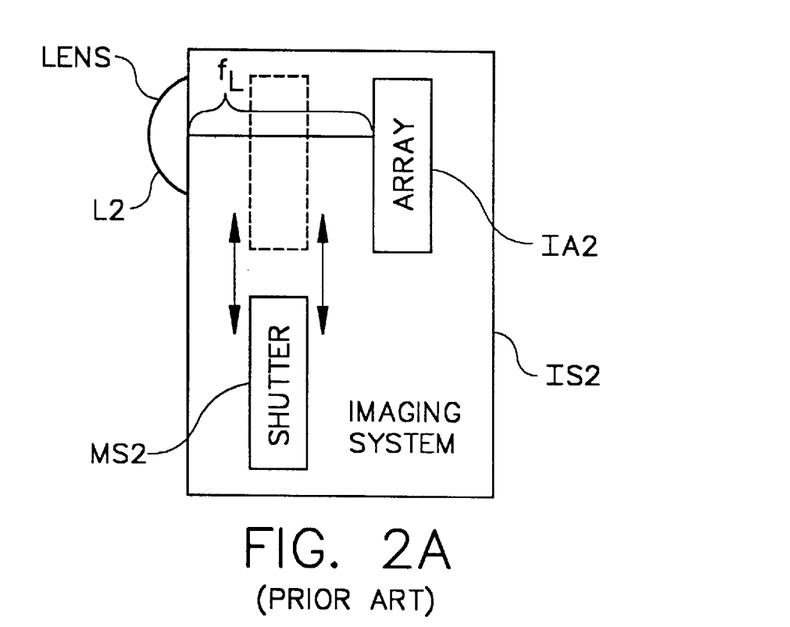
FIG. 2(a) is a partial block diagram of a prior art imaging system.
Figure 2B:
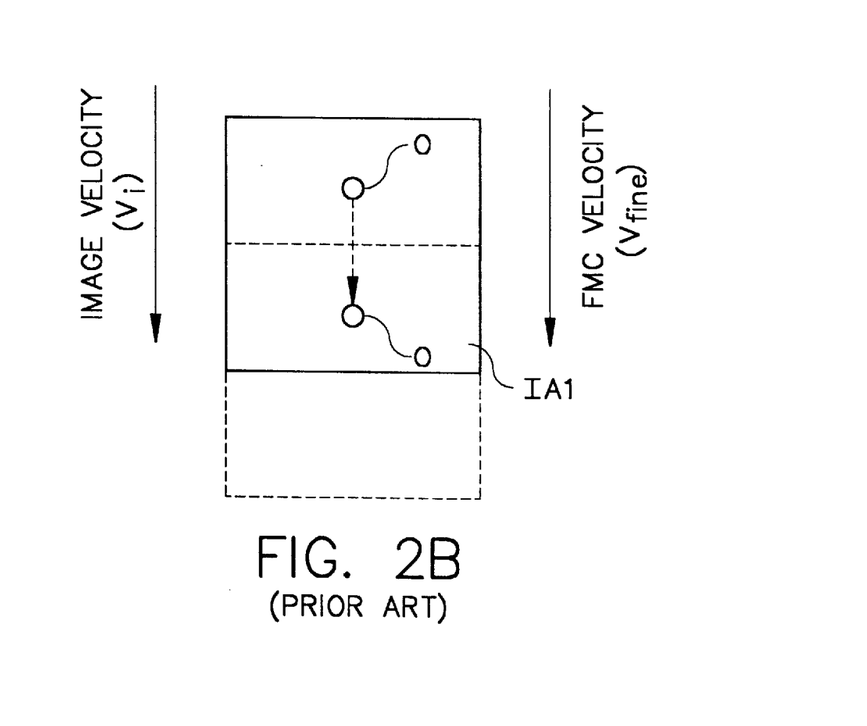
FIG. 2(b) is a diagram of an imaging array in the prior art imaging system shown in FIG. 2(a)

Referring to FIGS. 2(a–b), one prior art imaging system IS2 for compensating for image displacement $D_i$ is shown. As shown in FIG. 2(a), imaging system IS2 has a lens L2 located a focal length $f_L$ from an imaging array IA2. Lens L2 focuses a stationary scene onto imaging array IA2 which captures an image of the stationary scene. A mechanical shutter MS2 is located between lens L2 and imaging array IA2 and controls the amount of time $t_{exp}$ the stationary scene is exposed to imaging array IA2.

As shown in FIG. 2(b), the image of the stationary scene on imaging array IA2 has an image velocity $V_i$ and is traveling in the direction of the arrow adjacent imaging array IA2. As discussed earlier with respect to FIG. 1(c), during the exposure time $t_{exp}$ the image of the stationary scene is displaced a distance $D_i$ which causes the captured image to appear blurred. Referring back to FIG. 2(b), to compensate for the motion of the image of the stationary scene on imaging array IA2, the imaging system IS2 physically moves imaging array IA2 at a velocity $V_{FMC}$ within imaging system IS2 to keep the stationary scene centered on imaging array IA2 during the minimum exposure period $t_{exp}$. Preferably, $V_{FMC} = V_i$ so that the net image displacement $D_i = 0$. Once the minimum exposure time period $t_{exp}$ has expired, the mechanical shutter MS2 blocks the stationary scene from imaging array IA2 and the charge stored in imaging array IA2 representing the stationary scene is clocked out vertically. During the time when mechanical shutter MS2 is closed, imaging system IS2 cannot capture images. Although this imaging system IS2 works to reduce or eliminate blurring, this imaging system IS2 requires a mechanical shutter MS2 and a mechanical system (not shown) to move imaging array IA2 to compensate for forward motion which increases the complexity and cost of imaging system IS2 and reduces its reliability.

Figure 3A:
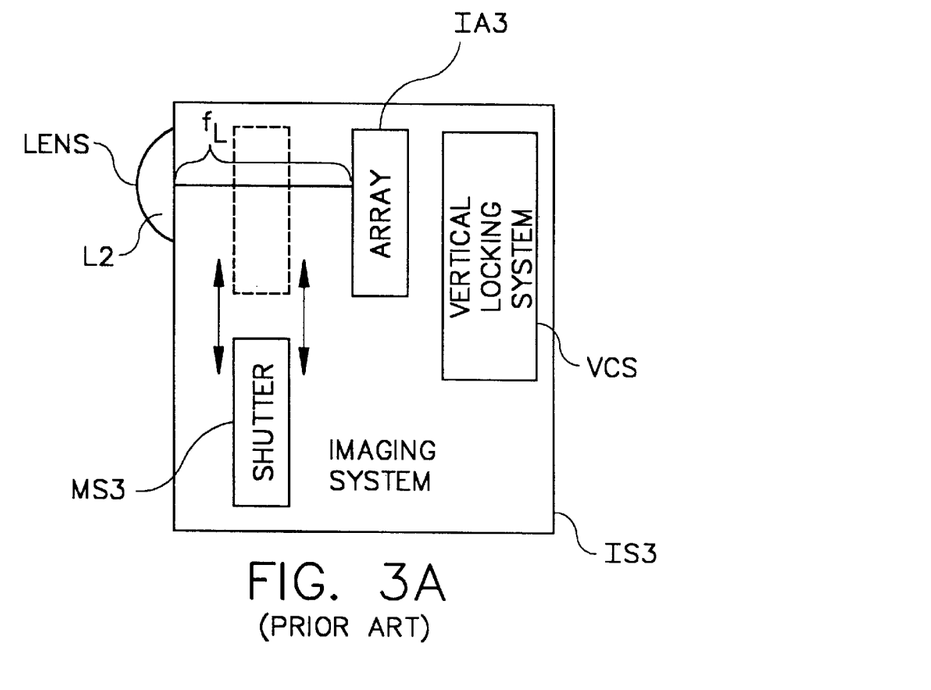
FIG. 3(a) is a cross-sectional view of part of a prior art imaging system.
Figure 3B:
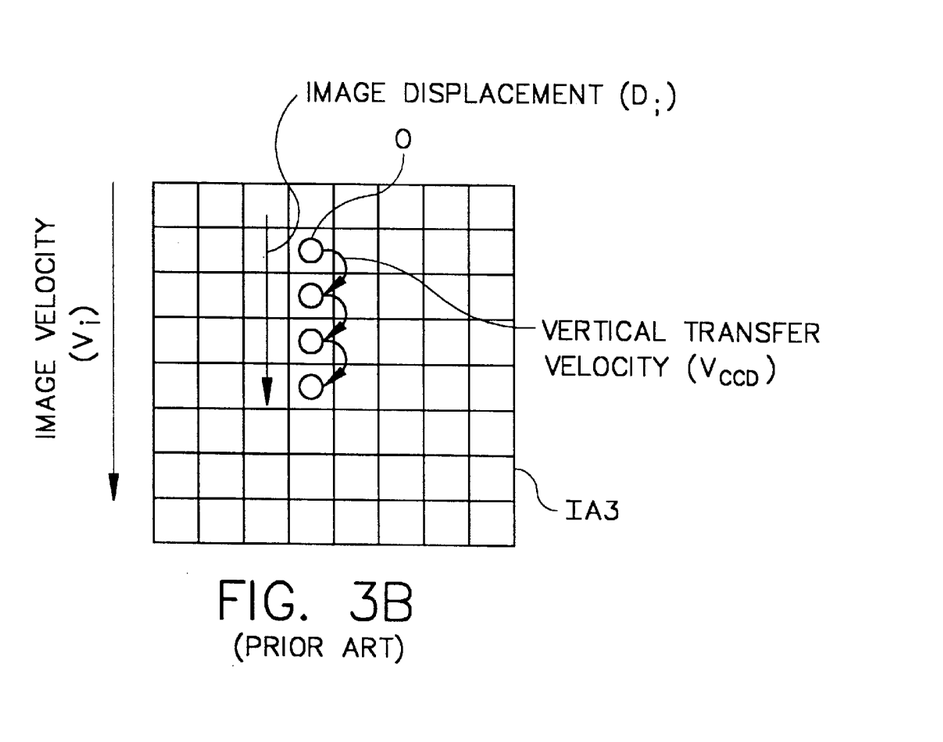
FIG. 3(b) is a diagram of an imaging array in the prior art imaging system shown in FIG. 3(a)

Referring to FIGS. 3(a–b), another prior art imaging system IS3 for compensating for image displacement $D_i$ is shown. As shown in FIG. 3(a), imaging system IS3 has a lens L3, a mechanical shutter MS3, an imaging array IA3, and a vertical clocking system VCS. The lens L3, mechanical shutter MS3, and imaging array IA3 operate the same as the lens L2, mechanical shutter MS2, and imaging array IA2 as described with reference to FIGS. 2(a–b). Vertical clocking system VCS is coupled to imaging array IA3 and as explained below clocks the movement of charge stored in imaging array IA3 to compensate for the motion of the image of the stationary scene on imaging array IA3.

Referring to FIG. 3(b), again the image of the stationary scene on imaging array IA3 has a velocity of $V_i$ and results in an image displacement of $D_i$ during the minimum exposure time period $t_{exp}$. Vertical clocking system VCS clocks the movement of charge stored in imaging array IA3 at a vertical transfer velocity $V_{CCD}$ to compensate for relative motion of the stationary scene with respect to imaging array IA3. Preferably, $V_{CCD} = V_i$ so that net image displacement $D_i = 0$. Once the minimum exposure time period $t_{exp}$ has expired, mechanical shutter MS3 blocks the stationary scene from imaging array IA3 and the charge stored in imaging array IA3 representing the stationary scene is clocked out. During the time when mechanical shutter MS3 is closed, imaging system IS3 cannot capture images. Although this imaging system IS3 eliminates the need for a mechanical system to move imaging array IA3 at a velocity $V_i$, imaging system IS3 still requires a mechanical shutter MS3 to limit the exposure time which increases the complexity and cost of imaging system IS3 and reduces its reliability. One example of such a prior art imaging system is disclosed in U.S. Pat. No. 5,155,597 to Lareau et al. which is herein incorporated by reference.

PROBLEMS TO BE SOLVED BY THE INVENTION

A need has therefore been felt for a system that can compensate for relative motion of the imaging system with respect to a scene to be captured without the need for either a mechanical shutter or a mechanical system to move the imaging array. A need has also existed to be able to continuously capture images without interruptions even when there is relative motion between the imaging system and scene being captured.

SUMMARY OF INVENTION

An imaging system in accordance with the present invention compensates for relative motion of the imaging system with respect to a scene to be captured. The imaging system includes an array, a light shield, a lens, a horizontal clocking system, and a vertical clocking system. The array includes at least two or more columns and rows of pixels, with each pixel exposed to the scene storing charge representative of the scene. The light shield is connected to the array and covers every other column of pixels. The lens is a focal length from the array and focuses the scene onto the array. The horizontal clocking system is coupled to each pixel in each row of the array and shifts charge from each pixel in each row exposed to the scene to each adjacent pixel in each row at a horizontal transfer frequency. The vertical clocking system is coupled to each pixel in each column covered by the light shield and shifts charge from each the pixel in each columns covered by the light shield to the next pixel in each column covered by the light shield at a vertical transfer frequency. The horizontal clocking system stops shifting charge between adjacent pixels in each row when an exposure time for capturing the scene expires. The imaging system may also include an imaging control system which determines a motion transfer rate which is the rate at which the scene moves down from one pixel in each column to the next pixel in each column.

A method for compensating for relative motion of the imaging system with respect to the scene in accordance with the present invention includes the steps of exposing the columns and rows of pixels in the array to the scene, each pixel exposed to the scene storing charge representative of the scene, shifting charge from each pixel in each row exposed to the scene to each adjacent pixel in each of the rows at a horizontal transfer frequency, and shifting charge from each pixel in each of the columns covered by the light shield down to the next pixel in each column covered by said light shield at a vertical transfer frequency. The method may also include the step of continuing to expose the columns and rows of pixels in the array to the scene, to shift charge from each pixel in each of the rows exposed to the scene to each adjacent pixel in each row at a horizontal transfer frequency, and to shift charge from each pixel in each columns covered by the light shield to the next pixel in each of the columns covered by the light shield at a vertical transfer frequency until a minimum exposure time has expired.

ADVANTAGEOUS EFFECTS OF THE INVENTION

An imaging system and method in accordance with the present invention provides several advantages. With the imaging system and method, compensation for motion of the scene relative to the imaging system can be accomplished without a mechanical shutter or a mechanical system to move the imaging array. As a result, the imaging system is simpler and more reliable and less costly than prior imaging systems because there are fewer parts. Additionally, since a mechanical shutter is not needed, the imaging system can continuously capture images without interruption.

DETAILED DESCRIPTION

Figure 4A:
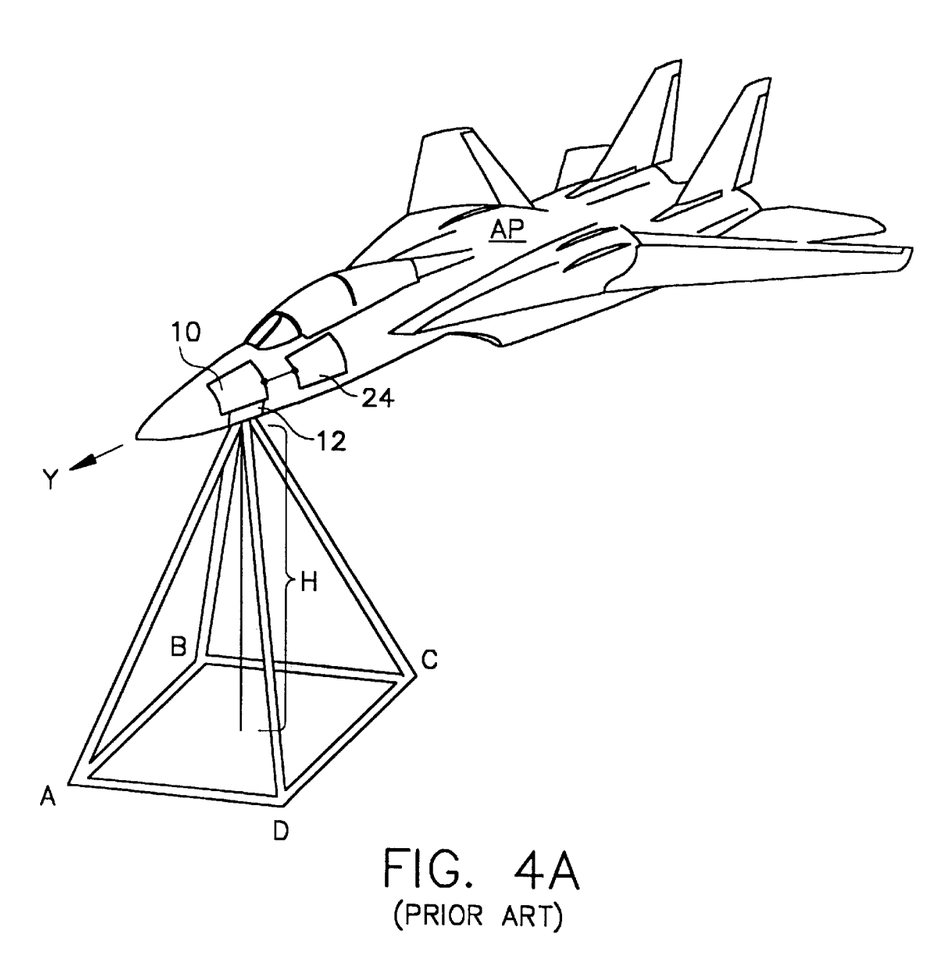
FIG. 4(a) is a pictorial view of an imaging system in an airplane capturing a stationary scene in accordance with the present invention.
Figure 4B:
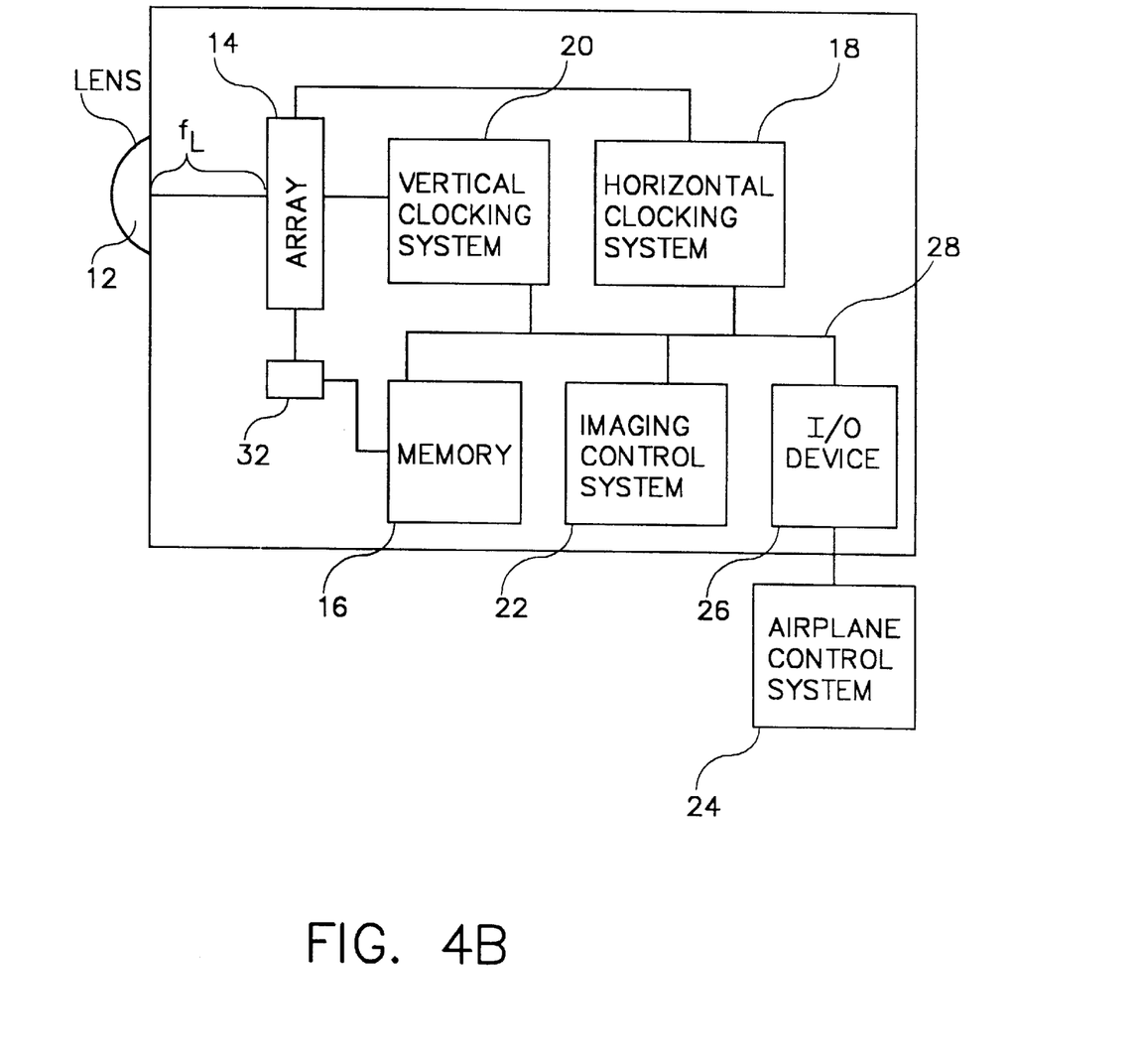
FIG. 4(b) is a partial block diagram of the imaging system shown in FIG. 4(a)

An imaging system 10 in accordance with the present invention is illustrated in FIG. 4(b). Imaging system 10 includes a lens 12, an imaging array 14, a memory 16, a horizontal clocking system 18, and a vertical clocking system 20, and an imaging control system 22. With imaging system 10, compensation for motion of the scene relative to imaging system 10 can be accomplished without a mechanical shutter or a mechanical system to move imaging array 14. As a result, imaging system 10 is simpler and more reliable and less costly than prior imaging systems because there are fewer parts. Additionally, since a mechanical shutter is not needed, imaging system 10 can continuously capture images without interruption.

Referring to FIG. 4(a), a pictorial view of imaging system 10 installed in an airplane AP traveling in the direction of arrow Y is illustrated. Imaging system 10 is coupled to an airplane control system 24 in airplane AP. Airplane control system 24 provides input signals to imaging system 10 which include the airplane's altitude, velocity with respect to ground, and desired exposure time. Imaging system 10 also includes a lens 12 which focuses a stationary scene, defined at the corners by letters A–D, on imaging array 14 shown in FIG. 4(b). Lens 12 is located at an altitude H above stationary scene, as shown in FIG. 4(a), and at a focal length $f_L$ from imaging array 14, as shown in FIG. 4(b).

Referring to FIG. 4(b), imaging system 10 includes airplane control system 24. Airplane control system 24 is coupled to input/output ("I/O") device 26 and inputs signals to I/O device 26 which include the airplane's altitude, velocity, and desired exposure time. I/O device 26 is coupled to a bus 28 which is coupled to imaging control system 22.

Imaging control system 22 is also coupled to memory 16, horizontal clocking system 18, and vertical clocking system 20 via bus 28. Imaging control system 22 is a programmed computer system which includes a central processing unit (not shown) and a memory (not shown) and operates on a set of instruction to compensate for any relative motion of the scene being captured with respect to imaging array 14. Imaging control system's functions include determining a motion transfer rate, a horizontal transfer frequency for horizontal clocking system 18, and a vertical transfer frequency for vertical clocking system 20, as well as the number of charge transfer cycles to achieve the desired exposure.

Figure 5A:
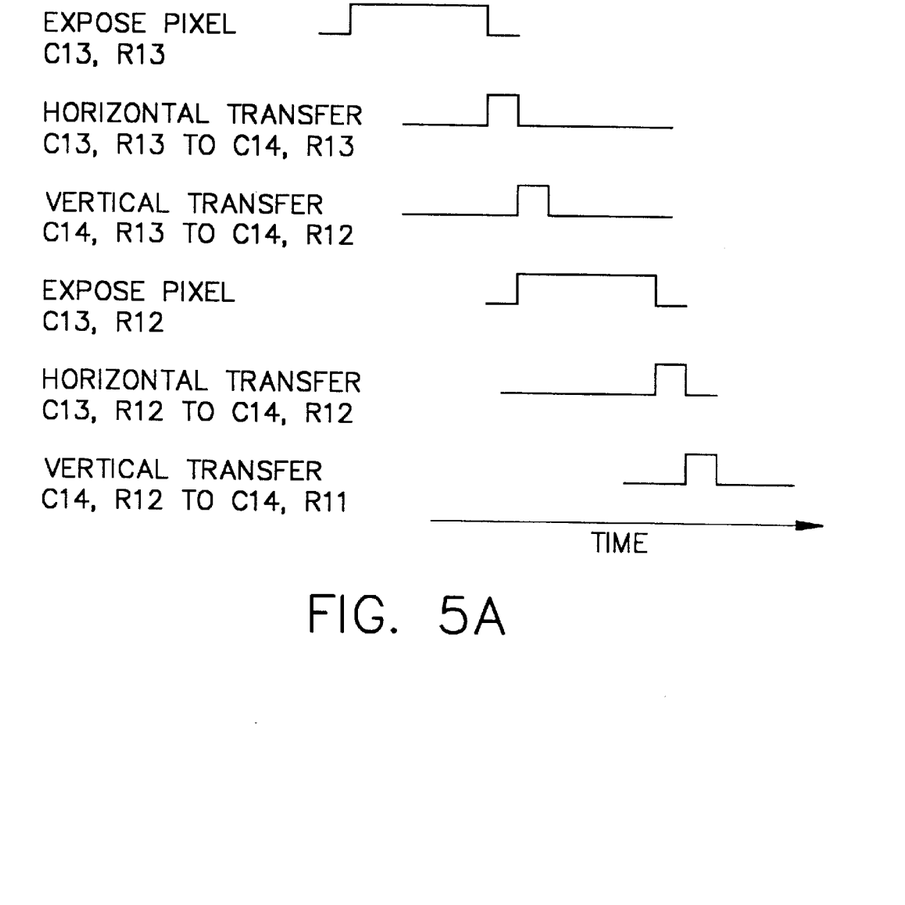
FIG. 5(a) is timing diagram for the horizontal and vertical transfer of charge in the imaging array relative to pixel exposure time shown in FIG. 4(d)
Figure 5B:
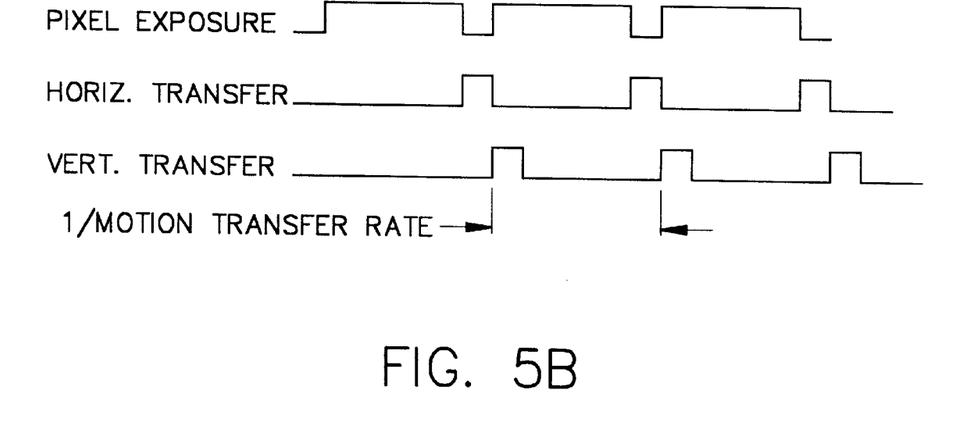
FIG. 5(b) is another timing diagram illustrating the horizontal and vertical transfer of charge relative to the pixel exposure time.

The motion transfer rate is the rate at which the same portion of the image of the scene on imaging array 14 moves from one pixel to the next pixel due to relative motion of the scene with respect to imaging array 14. The motion transfer rate is calculated by multiplying the relative scene velocity by the lens focal length and dividing by the altitude. The motion transfer is used to define the frequency of the horizontal and vertical charge transfers. If the motion transfer rate is expressed as L lines per second, the charge transfer frequencies will be equal to L transfers per second. The horizontal and vertical transfers occur at substantially the same frequency, but are phased in time with respect to each other such that a vertical transfer follows each horizontal transfer as shown in FIGS. 5(a–b). Although in FIGS. 5(a–b), the vertical transfer pulse immediately follows the horizontal transfer pulse, there may be a delay after the horizontal transfer pulse if desired.

The horizontal charge transfer moves charge in each imaging pixel in each row of array 14 to an adjacent column of pixels covered by a light shield 30. The vertical charge transfer moves accumulated charge in each pixel in each column covered by the light shield down to the next pixel in the column. Each cycle of horizontal transfer followed by a vertical transfer should be synchronized to the motion transfer rate. Preferably, the time required to move charge horizontally and vertically is substantially less than the time required for the scene to move from one row of pixels to the next and is less than the minimum exposure time for a pixel.

One example of calculating a motion transfer rate is set forth below. Consider an aircraft flying at an altitude of 1000 m at a speed of 200 m/s. A camera with a lens of focal length equal to 0.5 m is mounted to the aircraft. The camera has an array with a pixel pitch of 9 micrometers. The resulting motion transfer rate in this scenario can be expressed as:

Motion Transfer Rate =

$$[(200 \text{ m/s}) \times (0.5 \text{ m})/(1000 \text{ m})] \times 1 \text{ line}/9E\text{-}6 \text{ m} = 11,111 \text{ lines/sec.}$$

Consequently, the horizontal and vertical transfer frequencies are both 11,111 transfers per second.

Figure 4C:
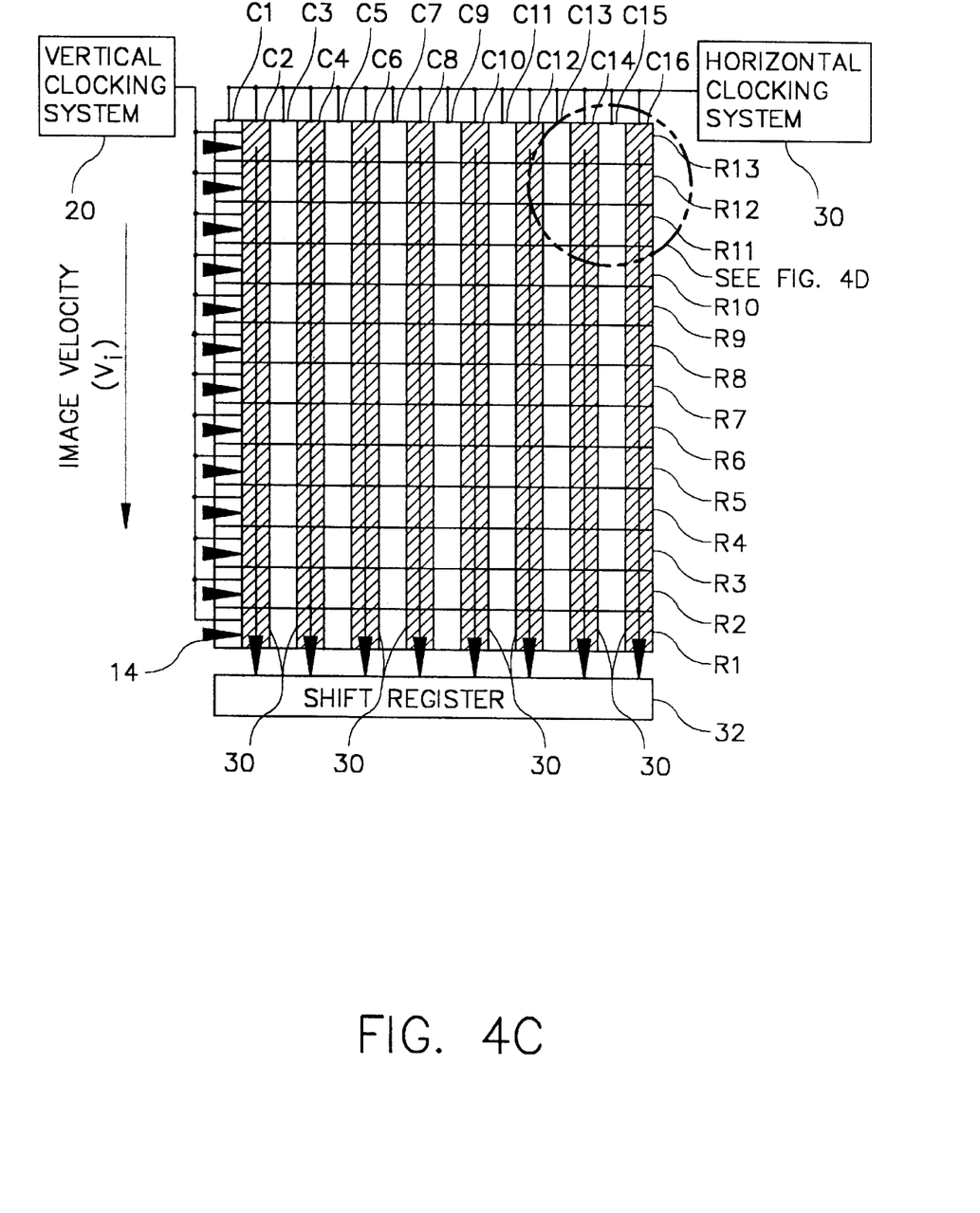
FIG. 4(c) is a block diagram of an imaging array in the imaging system shown in FIG. 4(b)
Figure 4D:
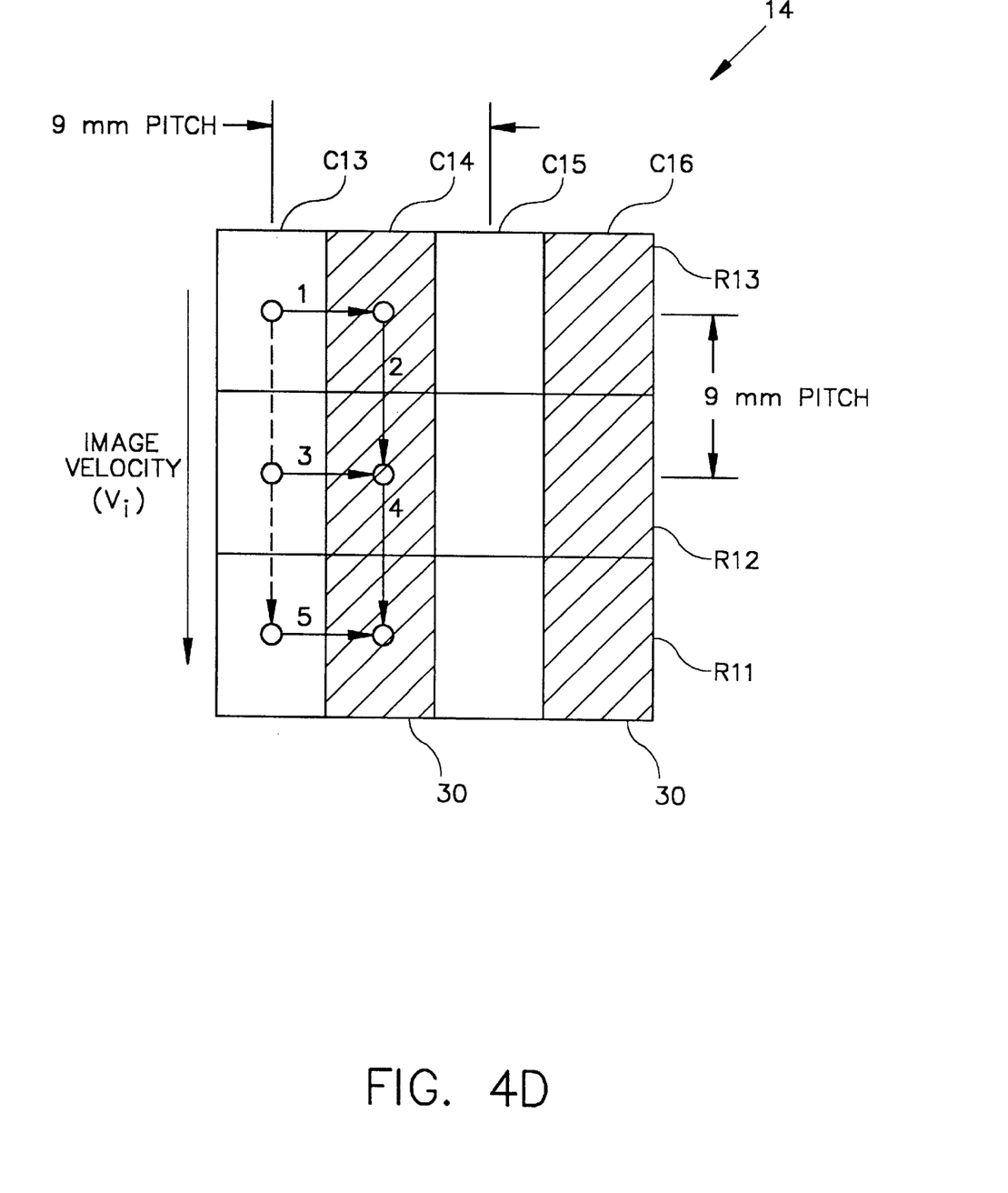
FIG. 4(d) is an enlarged block diagram view of the circled portion of the imaging array shown in FIG. 4(c)

Imaging system 10 also includes imaging array 14 which is positioned at a focal length $f_L$ from lens 12 and is coupled to horizontal clocking system 18, vertical clocking system 20, and a shift register 32. Imaging array 14 is a charge coupled device which includes a plurality of columns and rows of pixels. As shown in FIG. 4(c), imaging array 14 has sixteen columns of pixels C1–C16 and thirteen rows of pixels R1–R13, although the number of columns and rows of pixels in imaging array 14 can vary as needed. Light shield 30 is secured to imaging array 14 and covers every other column of pixels C2, C4, C6, C8, C10, C12, C14, and C16. In this particular embodiment, imaging array 14 is an interline transfer charge coupled device, such as Kodak's KAI-1000. As shown in FIG. 4(d), the pitch between the center of columns C13 and C15 with exposed pixels is 9 $\mu$m and the pitch between the center of rows R13 and R12 of pixels is also about 9 $\mu$m, although the distance between columns and between rows can vary as needed.

Referring back to FIG. 4(c), when imaging array 14 is exposed to the scene, each pixel in columns C1, C3, C5, C7, C9, C11, C13, and C15 is able to convert light received from the scene to be captured into charge which is stored in a potential well in each pixel. The charges stored in the pixels in imaging array 14 contain information about the scene being captured. Pixels in columns C2, C4, C6, C8, C10, C12, C14, and C16 are covered by light shield 30 and thus are not exposed to the scene. The particular operation of charge coupled devices, such as imaging array 14, in storing charge representative of a scene are well known and is described in standard texts, such as *Solid State Electronic Devices*, Chp. 9, Prentice-Hall, Inc. (1980), pp. 355–361 and in *MicroElectronics*, Sec. 9-8, pp. 298–312, McGraw-Hill Book Company (1979) which are herein incorporated by reference.

Imaging system 10 also includes shift register 32 which is coupled to each pixel in the last row R1 of pixels in imaging array 14 and to memory 16. Shift register 32 shifts charge representative of the captured image of the scene from imaging array 14 to memory 16 for storage at a shift transfer rate. Memory 16 may be any type of storage device, such as a solid state memory, hard disk, or magnetic tape. Preferably, the shift transfer rate is faster than or substantially equal to the motion transfer rate.

Referring to FIGS. 4(b–c), imaging system 10 includes horizontal and vertical clocking systems 18 and 20 which are coupled to imaging array 14 and to imaging control system 22 via bus 28. Horizontal and vertical clocking systems 18 and 20 include a master clock (not shown), counters (not shown), and clock drivers (not shown) for each column and row of pixels coupled to horizontal and vertical clocking systems 18 and 20. The process of shifting charge in a charge coupled device, such as imaging array 14, is well known and can be found in standard texts such as *Solid State Electronic Devices*, Chp. 9, Prentice-Hall, Inc. (1980), pp. 355–361 and in *MicroElectronics*, Sec. 9-8, pp. 298–312, McGraw-Hill Book Company (1979) and also in U.S. Pat. No. 5,155,597 to Lareau et al. which are all herein incorporated by reference.

As shown in FIG. 4(c), horizontal clocking system 18 is coupled to each pixel in each row R1–R13 in imaging array 14, although for ease of illustration only connections from horizontal clocking system 18 to each pixel in row R13 are illustrated. Similarly, vertical clocking system 20 is coupled to each pixel in each column C2, C4, C6, C8, C10, C12, C14, and C16 covered by light shield 30, although for ease of illustration only the connections from vertical clocking system 20 to the pixels in column C2 are illustrated. Horizontal and vertical clocking systems 18 and 20 control the horizontal and vertical transfer frequencies, respectively, at which charge stored in pixels in imaging array are transferred horizontally and vertically. The horizontal and vertical transfer frequencies are utilized to synchronize motion of charge stored in pixels with motion of the scene relative to imaging array 14 to prevent blurring. Preferably, the horizontal and vertical transfer frequencies are synchronized so that image displacement on imaging array 14 during the minimum exposure time $t_{exp}$ is substantially equal to zero.

Referring to FIGS. 4(a–d), the operation of imaging system 10 will be illustrated. To capture an aerial image, airplane AP must first be located over the stationary scene to be captured. As shown in FIG. 4(a), airplane AP is disposed over stationary scene defined by four corners A–D. As airplane AP is traveling in the direction of arrow Y, airplane control system 24 provides input signals to imaging system which include the airplane's altitude, velocity with respect to ground, and desired exposure time. As explained below, these input signals are necessary to determine the motion transfer rate, horizontal transfer frequency, and vertical transfer frequency, and the number of imaging transfers.

Referring to FIG. 4(b), imaging control system 22 receives altitude and scene velocity signals from airplane control system 24 and the focal length $f_L$ from memory (not shown) in imaging control system 22 and in response determines the motion transfer rate as described previously.

From the motion transfer rate, the horizontal clocking system 18 determines the horizontal transfer frequency as described previously. Similarly, from the motion transfer rate, the vertical clocking system 20 calculates the vertical transfer frequency as described previously. Preferably, the horizontal transfer frequency is substantially equal to, but out of phase with, the vertical transfer frequency. In addition, the imaging control system 22 receives the desired exposure signals from the airplane control system 24 and from the calculated motion transfer rate calculates the total number of transfers for the image. Meanwhile, lens 12 in imaging system 10 focuses stationary scene, defined by corners A–D, onto imaging array 14.

Referring to FIG. 4(c), the image of the stationary scene on imaging array 14 has a velocity $V_i$ and is traveling in the direction of the arrow adjacent imaging array. As explained earlier with reference to FIGS. 1(a–c), blurring of the captured image will occur if not compensated for because the stationary scene does not remain on the same pixels of imaging array 14 for the duration of the minimum exposure time $t_{exp}$ needed to capture the image of the scene. Accordingly, information regarding a particular portion of the image of the scene will typically be represented by charge stored in a number of consecutive pixels. As explained below, the horizontal and vertical transfer frequencies determined above are utilized to synchronize motion of charge stored in pixels with the motion of the scene relative to imaging array 14 to prevent blurring.

When stationary scene is initially focused on pixels in columns C1, C3, C5, C7, C9, C11, C13, and C15, the pixels store charge which represents information about the scene being captured. The pulses in the pixel exposure line in timing diagram in FIG. 5(b) illustrate the time during which charge is stored. Since the pixels in columns C2, C4, C6, C8, C10, C12, C14, and C16, are covered by light shield 30, these pixels do not store charge representative of the scene. Once charge representing a portion of the image is stored, then the charge in the pixels in columns C1, C3, C5, C7, C9, C11, C13, and C15 are shifted horizontally to the pixels in columns C2, C4, C6, C8, C10, C12, C14, and C16 at a horizontal shift frequency. Once the horizontal shift is completed, then the charge in each pixel in columns C2, C4, C6, C8, C10, C12, C14, and C16 is shifted down one pixel in columns C2, C4, C6, C8, C10, C12, C14, and C16 at a vertical transfer frequency. The pulses in the horizontal transfer and vertical transfer lines in timing diagram in FIG. 5(b) represent the time during which charge is shifted horizontally and vertically, respectively.

Meanwhile, the image of the scene has shifted down one row of pixels due to motion of the scene relative to imaging array 14 at the motion transfer rate. The pixels in columns C1, C3, C5, C7, C9, C11, C13, and C15 one pixel down from the previous pixels in each column C1, C3, C5, C7, C9, C11, C13, and C15 are exposed to the same portion of the scene previously exposed to the pixels directly above these pixels. The pixels in columns C1, C3, C5, C7, C9, C11, C13, and C15, store charge representing a portion of the same portion of the image. The charge stored in the pixels in columns C1, C3, C5, C7, C9, C11, C13, and C15, is then shifted horizontally to the pixels in columns C2, C4, C6, C8, C10, C12, C14, and C16 at the horizontal transfer frequency. The shifted charge is combined with the charge already in the pixels in columns C2, C4, C6, C8, C10, C12, C14, and C16 which was previously shifted down. This technique of shifting down and combining charge is well-known and is equivalent to time-delay integration.

The process of shifting charge horizontally and vertically is repeated until the required minimum exposure time $t_{exp}$ for capturing the stationary scene has expired. Once the required exposure time has passed, then horizontal clocking system 18 no longer shifts charge horizontally from columns C1, C3, C5, C7, C9, C11, C13, and C15 to columns C2, C4, C6, C8, C10, C12, C14, and C16. The vertical shift of charges continues until the charge in the pixels in columns C2, C4, C6, C8, C10, C12, C14, and C16 reaches the end of the columns C2, C4, C6, C8, C10, C12, C14, and C16. When charges in imaging array 14 reaches row R1, the charges are transferred into shift register 32. Shift register 32 shifts the charges out to memory 16 at the motion transfer rate.

Referring to FIGS. 4(d) and 5(a), another example of how imaging system 10 compensates for relative motion of the stationary scene relative to imaging array 14 is illustrated. Again, lens 12 of imaging system 10 focuses the image of the stationary scene on imaging array 14. The image of the stationary scene is moving at a velocity $V_i$ in the direction of the arrow adjacent imaging array 14. When the image of the stationary scene is focused on imaging array 14, a specific portion of the image is focused on pixel at column C13, row R13. The pixel at column C13, row R13 stores charge representative of that specific portion of the image of the stationary scene. The pulse in the first expose pixel line in FIG. 5(a) represents the time during which the pixel at column C13, row R13 is exposed to that portion of the image. As that specific portion of the image of the stationary scene moves in the direction of the arrow adjacent imaging array 14, the charge in the pixel at column C13, row R13 is shifted horizontally to the pixel at column C14, row R13 at a horizontal transfer frequency as shown in the first horizontal transfer line in FIG. 5(a). Once the charge is shifted horizontally to the pixel at column C14, row R13, the charge is shifted down from the pixel at column C14, row R13 to the pixel at column C14, row R12 at a vertical transfer frequency as shown in the first vertical transfer line in FIG. 5(a).

Meanwhile, the specific portion of the image previously focused on the pixel at column C13, row R13 has now moved down to the pixel at column C13, row R12. The pixel at column C13, row R12 stores charge representative of that specific portion during the pulse in the second expose pixel line in FIG. 5(a). Again, as that specific portion of the image of the stationary scene moves in the direction of the arrow adjacent imaging array 14, the charge in the pixel at column C13, row R12 is shifted horizontally to the pixel at column C14, row R12 at the horizontal transfer frequency and is combined with the charge already there from the previous shift down from the pixel at column C14, row R13 as shown in the second horizontal transfer line in FIG. 5(a). This technique of combining is well known and is equivalent to time-delay integration. The charge at the pixel at column C14, row R12 is shifted down to the pixel at column C14, row R11 at a vertical transfer frequency as shown in the second vertical transfer line in FIG. 5(b).

The specific portion of the image previously focused on the pixel at column C13, row R12 has now moved down to the pixel at column C13, row R11. The pixel at column C13, row R11 stores charge representative of that specific portion. As the specific portion of the image of the stationary scene continues to moves in the direction of the arrow adjacent imaging array 14, the charge in the pixel at column C13, row R11 is shifted horizontally to the pixel at column C14, row R11 at the horizontal transfer frequency and is combined with the charge already there from the previous shift down from the pixel at column C14, row R12. The process of shifting charge horizontally from column C13 to column C14 continues until the minimum exposure time $t_{exp}$ for capturing the stationary scene has expired. When the minimum exposure time $t_{exp}$ for capturing the stationary scene has expired, horizontal clocking system 18 no longer clocks the charge from column C13 into column C14. The charge which has been accumulated in column C14 is shifted out to shift register 30 at the vertical transfer frequency when the charge reaches the pixel at column C14, row R11. The charge in shift register 32 is shifted out to memory 16 at the shift transfer rate.

Accordingly with imaging system 10, compensation for motion of the scene relative to imaging array 14 is accomplished without any mechanical shutters or other mechanical systems to move imaging array 14. Without the mechanical shutter or mechanical system to move imaging array 14, imaging system 10 is less complex and costly and more reliable because there are fewer parts which can malfunction. Additionally, since imaging system 10 does not require a shutter, imaging system 10 can continuously capture images without interruption.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, but not expressly stated herein. These modifications, alterations and improvements are intended to be suggested hereby, and within the spirit and scope of the invention. Accordingly, the invention is limited only by the following claims and equivalents thereto.

PARTS LIST 10 imaging system
12 lens
14 imaging array
16 memory
18 horizontal clocking system
20 vertical clocking system
22 imaging control system
24 airplane control system
26 input/output device
28 bus
30 light shield
32 shift register

What is claimed is:

1. An imaging system for recording an image of a scene, the imaging system compensating for relative motion of the imaging system with respect to the scene, said imaging system comprising:

an array of at least two or more columns and rows of pixels, each said pixel exposed to the scene storing charge representative of the scene;

a light shield connected to said array, said light shield covering every other column of pixels;

a horizontal clocking system coupled to each said pixel in each said row of said array, said horizontal clocking system shifting charge from each said pixel in each said row exposed to the scene to each said adjacent pixel in each said row at a horizontal transfer frequency; and a vertical clocking system coupled to each pixel in each said column covered by said light shield, said vertical clocking system shifting charge from each said pixel in each said columns covered by said light shield to the next said pixel in each said column covered by said light shield at a vertical transfer frequency, wherein said horizontal transfer frequency is substantially equal to said vertical transfer frequency.

2. The imaging system as set forth in claim 1 further comprising an imaging control system which determines said motion transfer rate in response to aircraft altitude, relative scene velocity and lens focal length.

3. The imaging system as set forth in claim 1 wherein said horizontal clocking system stops shifting charge between adjacent said pixels in each said row when an exposure time for capturing the scene expires.

4. The imaging system as set forth in claim 1 further comprising a lens a focal length from said array, said lens focusing the scene onto said array.

5. The imaging system as set forth in claim 1 further comprising:

a memory for storing the charge representative of the scene; and a shift register for shifting the charge from said columns covered by said light shield to said memory at a shifting transfer rate.

6. The imaging system as set forth in claim 5 wherein said shifting transfer rate is less than or equal to a motion transfer rate.

7. The imaging system as set forth in claim 1 wherein said array is an interline charge coupled device.

8. The imaging system as set forth in claim 1 wherein said imaging system is installed in a vehicle capable of moving.

9. A method for recording an image of a scene with an imaging system which compensates for relative motion of the scene with respect to the imaging system, the imaging system comprising an array of at least two or more columns and rows of pixels, each of the pixels exposed to the scene storing charge representative of the scene and a light shield connected to said array which covers every other column of pixels, the method comprising the steps of:

exposing the columns and rows of pixels in the array to the scene, each said pixel exposed to the scene storing charge representative of the scene;

shifting charge from each said pixel in each said row exposed to the scene to each said adjacent pixel in each said row at a horizontal transfer frequency; and shifting charge from each said pixel in each said columns covered by said light shield to the next said pixel in each said column covered by said light shield at a vertical transfer frequency, wherein said horizontal transfer frequency is substantially equal to said vertical transfer frequency.

10. The method as set forth in claim 9 further comprising the step of continuing to expose the columns and rows of pixels in the array to the scene, to shift charge from each said pixel in each said row exposed to the scene to each said adjacent pixel in each said row at a horizontal transfer frequency, and to shift charge from each said pixel in each said columns covered by said light shield to the next said pixel in each said column covered by said light shield at a vertical transfer frequency until a minimum exposure time has expired.

11. The method as set forth in claim 10 further comprising the step of continuing to shift charge from each said pixel in each said columns covered by said light shield to the next said pixel in each said column covered by said light shield at a vertical transfer frequency when said exposure time expires.

12. The method as set forth in claim 9 further comprising the steps of:

shifting the charge from the last pixel in each said column of said array into a shift register; and shifting the charge in the shift register into a memory at a shifting transfer frequency.

13. The method as set forth in claim 12, wherein said shifting transfer rate is less than or equal to said motion transfer rate.

* * * * *

UNITED STATES PATENT AND TRADEMARK OFFICE
CERTIFICATE OF CORRECTION

| | | |
|---|---|---|
| PATENT NO. | : 5,835,137 | Page 1 of 1 |
| APPLICATION NO. | : 08/612709 | |
| DATED | : November 10, 1998 | |
| INVENTOR(S) | : Donald M. McKeown | |

It is certified that error appears in the above-identified patent and that said Letters Patent is hereby corrected as shown below:

Title Page,

Insert the following priority claim after item (22):

-- Related U.S. Application Data

(60)   Provisional application No. 60/000,396, filed on June 21, 1995. --

Signed and Sealed this

First Day of April, 2014

Michelle K. Lee
*Deputy Director of the United States Patent and Trademark Office*